(12) United States Patent
Shipman et al.

(10) Patent No.: US 8,123,180 B2
(45) Date of Patent: Feb. 28, 2012

(54) RAPID ACQUISITION SHOOTING SYSTEM

(75) Inventors: Daniel B. Shipman, Oroville, CA (US); Joe B. Dunning, Magalia, CA (US); Ernest E. Creamer, Berry Creek, CA (US); Ron Smith, Oroville, CA (US); Steven J. Koch, Oroville, CA (US)

(73) Assignee: Alliant Techsystems Inc., Minneapolis, MN (US)

( * ) Notice: Subject to any disclaimer, the term of this patent is extended or adjusted under 35 U.S.C. 154(b) by 1152 days.

(21) Appl. No.: 11/934,431

(22) Filed: Nov. 2, 2007

(65) Prior Publication Data
US 2009/0113779 A1 May 7, 2009

(51) Int. Cl.
*F16M 11/04* (2006.01)
*F41C 27/00* (2006.01)

(52) U.S. Cl. ...... 248/188.2; 248/178.1; 42/94; 254/126; 254/129; 89/37.09

(58) Field of Classification Search .................. 248/168, 248/180.1, 188.2, 188.4, 419, 423, 170, 177.1, 248/178.1, 219.2, 370, 371, 354.1, 592, 593, 248/595, 405, 413; 42/94; 89/37.03, 37.04, 89/37.13, 37.01, 37.09; 254/126, 124, 129
See application file for complete search history.

(56) References Cited

U.S. PATENT DOCUMENTS

| | | | | |
|---|---|---|---|---|
| 3,583,743 | A | * | 6/1971 | Newell ........................ 248/354.1 |
| 4,583,713 | A | * | 4/1986 | Fukura et al. ................. 254/126 |
| 4,720,082 | A | * | 1/1988 | Yang ............................ 254/126 |
| 5,060,410 | A | | 10/1991 | Mueller |
| 5,715,625 | A | | 2/1998 | West, III |
| 5,815,974 | A | * | 10/1998 | Keng ................................. 42/94 |
| 5,937,560 | A | | 8/1999 | Beltz |
| 6,058,641 | A | | 5/2000 | Vecqueray |
| 6,192,613 | B1 | | 2/2001 | Lantz |
| 7,152,358 | B1 | | 12/2006 | LeAnna et al. |
| 7,730,824 | B1 | * | 6/2010 | Black ........................... 89/37.03 |
| 2004/0134113 | A1 | * | 7/2004 | Deros et al. ....................... 42/94 |
| 2005/0242250 | A1 | * | 11/2005 | Keng et al. .................... 248/168 |
| 2009/0113779 | A1 | * | 5/2009 | Shipman et al. .................. 42/94 |

OTHER PUBLICATIONS

SPEC-REST TM Instructions Manual, Revised Apr. 17, 2007. Lone Star Field Products, Garland, TX.

* cited by examiner

*Primary Examiner* — Tan Le
(74) *Attorney, Agent, or Firm* — Vidas, Arrett & Steinkraus, P.A.

(57) ABSTRACT

The invention is directed towards an elevation adjustment mechanism which has a mechanism for coarsely adjusting the pitch rotation comprising a lever actuated clamping assembly and a mechanism for finely adjusting the pitch rotation comprising a threaded rod mechanism.

12 Claims, 7 Drawing Sheets

RAPID ACQUISITION SHOOTING SYSTEM

CROSS-REFERENCE TO RELATED APPLICATIONS

Not Applicable

STATEMENT REGARDING FEDERALLY SPONSORED RESEARCH

Not Applicable

FIELD OF THE INVENTION

The present invention relates generally to an apparatus, such as a shooting bench, for shooting a firearm, taking photographs with a camera, or watching nature with an optical instrument such as binoculars or a telescope. More specifically, the invention concerns to an elevation adjustment mechanism that allows the user to quickly acquire a target with a firearm, camera or optical instrument.

BACKGROUND OF THE INVENTION

An apparatus to stabilize and aim a device is often used by marksman to improve their shooting accuracy, by photographers to obtain a desired photograph and by nature lovers to see an elusive animal. One example of such an apparatus is a shooting bench. In order to change the line of sight or aim of the device being supported by the apparatus, a means for changing the position of the device is required.

BRIEF SUMMARY OF THE INVENTION

The invention is directed towards an elevation adjustment mechanism which has a mechanism for coarsely aiming a device that comprises a coarse adjustment lever, a coarse adjustment rod and a clamping assembly. The coarse adjustment mechanism is constructed and arranged so that depression of the coarse adjustment lever lifts the clamping assembly away from the coarse adjustment rod thereby allowing the user to translate the coarse adjustment rod and to adjust the aim of the device.

The invention is also directed towards elevation adjustment mechanism comprising a housing, a coarse adjustment lever, a coarse adjustment rod, a clamping assembly, a fine adjustment washer, a fine adjustment nut and a fine adjustment rod. The housing is comprised of a sleeve and a ram cylinder. The sleeve and the ram cylinder are hollow tubes with at least a portion of the sleeve being disposed within the ram cylinder. The coarse adjustment rod has a first portion extending into a first end of the housing so that the housing encircles at least a portion of the coarse adjustment rod. The clamping assembly is engaged to the coarse adjustment lever which is engaged to the housing. The clamping assembly is positioned at least partially within an opening defined by the housing so that it is releasably engaged to a portion of the coarse adjustment rod disposed within the housing. In some embodiments, the fine adjustment washer is slipped onto one end of the sleeve and the fine adjustment nut is slipped onto the other end of the sleeve before being engaged to one another and to the sleeve. In other embodiments, the fine adjustment nut is engaged to the sleeve by set screws. The fine adjustment rod has a first portion that extends through an end of the sleeve and a second portion that is disposed within the sleeve.

In at least one embodiment, the invention is directed towards an apparatus, such as a shooting bench for example, that supports a device such as a firearm, a camera, or an optical device and that has an elevation adjustment mechanism to aim the device. The apparatus comprises a vertical support member, at least one leg, a platform to support a device such as a firearm, camera or binoculars, and an elevation adjustment mechanism. A portion of the at least one leg and a portion of the platform is engaged to the vertical support member. A portion of the elevation adjustment mechanism is engaged to a portion of the vertical support member and a portion of the elevation adjustment mechanism is engaged to a portion of the platform. The elevation adjustment mechanism is constructed and arranged to adjust the pitch rotation of the platform, thereby adjusting the pitch rotation of the device supported by the platform. The elevation adjustment mechanism comprises a mechanism for coarsely adjusting the pitch rotation comprising a lever actuated clamping assembly, and a mechanism for finely adjusting the pitch rotation comprising a threaded rod mechanism.

DETAILED DESCRIPTION OF THE INVENTION

While this invention may be embodied in many forms, there are described in detail herein specific embodiments of the invention. This description is an exemplification of the principles of the invention and is not intended to limit the invention to the particular embodiments illustrated.

For the purposes of this disclosure, like reference numerals in the figures shall refer to like features unless otherwise indicated.

Figure 1:
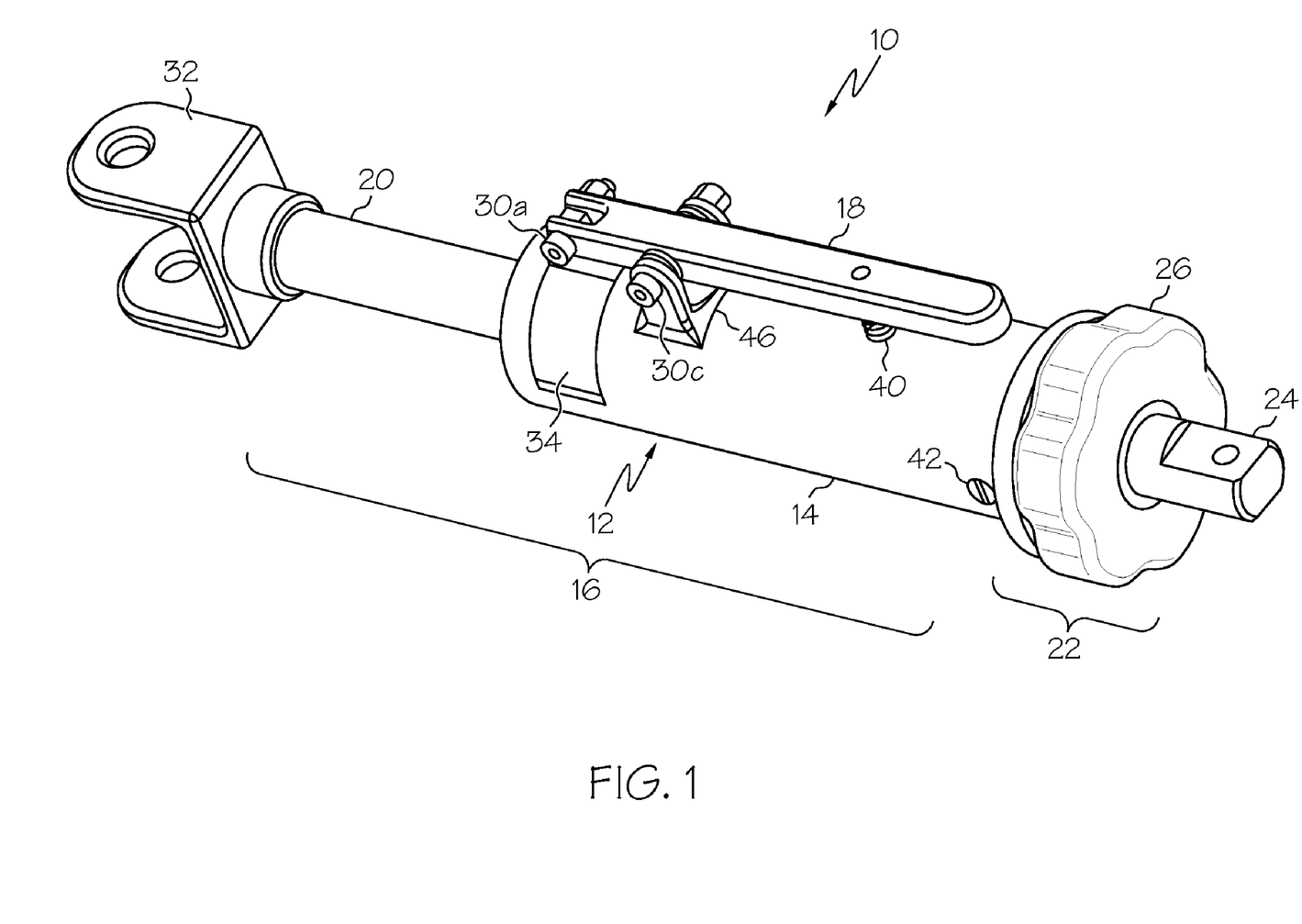
FIG. 1 is a view of an elevation adjustment mechanism.

FIG. 1 is a side view of an elevation adjustment mechanism 10 that has a coarse adjustment mechanism 16 and a fine adjustment mechanism 22. As shown in the figures, portions of both the coarse adjustment mechanism 16 and the fine adjustment mechanism 22 are disposed within a housing 12. In some embodiments, the housing 12 comprises a sleeve 13 and a ram cylinder 14, shown in FIG. 3. At least a portion of the sleeve 13 is disposed within the ram cylinder 14. Thus, the diameter of the sleeve 13 is smaller than the diameter of the ram cylinder 14. When the sleeve 13 is disposed within the ram cylinder 14, the sleeve 13 and the ram cylinder 14 are engaged to one another by any means, including, but not limited to, screws. In other embodiments, the housing 12 is a single cylinder, the ram cylinder 14.

Figure 7:
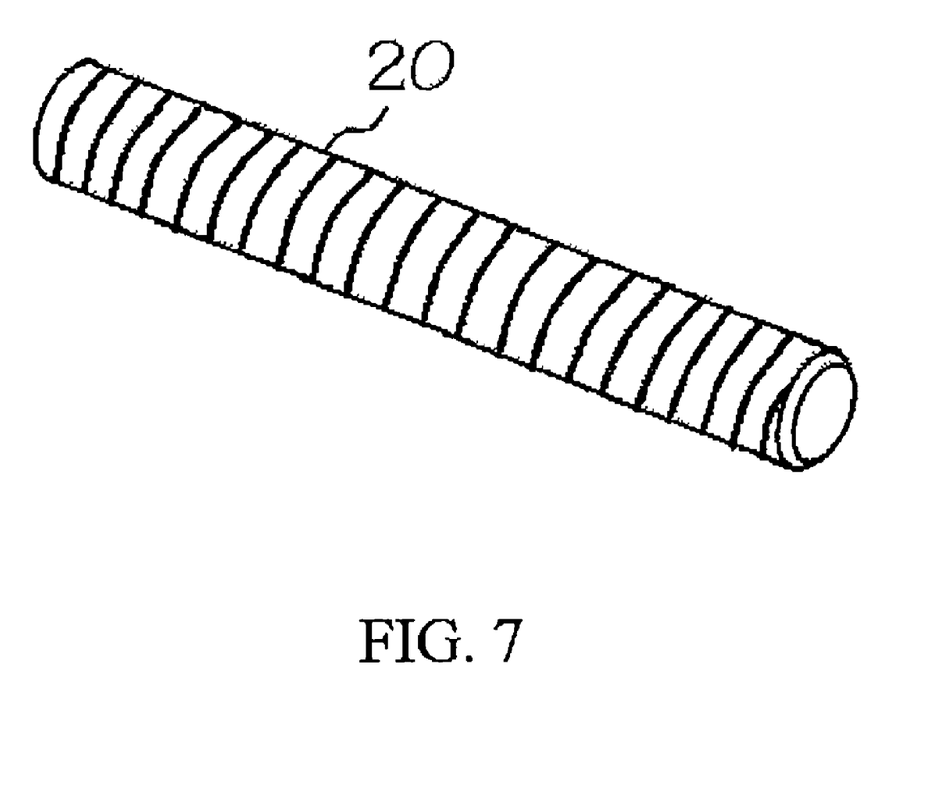
FIG. 7 is a view of a threaded coarse adjustment rod.

In at least one embodiment, the coarse adjustment mechanism 16 is a linear slide mechanism. In this embodiment, the coarse adjustment mechanism 16 comprises a coarse adjustment lever 18, a coarse adjustment rod 20 and a clamping assembly 34. It is within the scope of the invention for the coarse adjustment rod 20 to have any length and diameter. In some embodiments, the coarse adjustment rod 20 is a threaded rod. One example of a coarse adjustment rod 20 that is a threaded rod is shown in FIG. 7. In other embodiments, the coarse adjustment rod 20 is a smooth rod. It is within the scope of the invention for the clamping assembly 34 to be any means that releasably engages the coarse adjustment rod 20. In some embodiments, the clamping assembly 34 is a half-nut assembly. In other embodiments, the clamping assembly 34 is a half-cylinder. Note that the clamping assembly 34 has a configuration that is complementary to the configuration of the coarse adjustment rod 20 so that the clamping assembly 34 can releasably engage the coarse adjustment rod 20.

In some embodiments, the coarse adjustment mechanism 16 comprises a clamping assembly 34 that is a half-nut assembly and a coarse adjustment rod 20 that is a threaded rod. In other embodiments, the coarse adjustment mechanism 16 comprises a clamping assembly 34 that is a half-cylinder and a coarse adjustment rod 20 that is a smooth rod. Both of these embodiments have the configuration shown in FIG. 1. In some embodiments, the clamping assembly 34 is a half-cylinder which is not threaded and which is lined with a high friction material. In other embodiments, the clamping assembly 34 is made of a high friction material. In at least one embodiment, the materials used to make the smooth rod and the half-cylinder provide adequate friction in order to eliminate translation of the smooth rod once the half-cylinder is engaged with the smooth rod. Examples of high friction material, include, but are not limited to, elastomer rubber compounds such as nitrile, silicone, neoprene, viton, and ethylene propylene diene monomer rubber (EPDM). In this embodiment, sufficient spring force on the coarse adjustment lever provides quick coarse adjustment.

Figure 2:
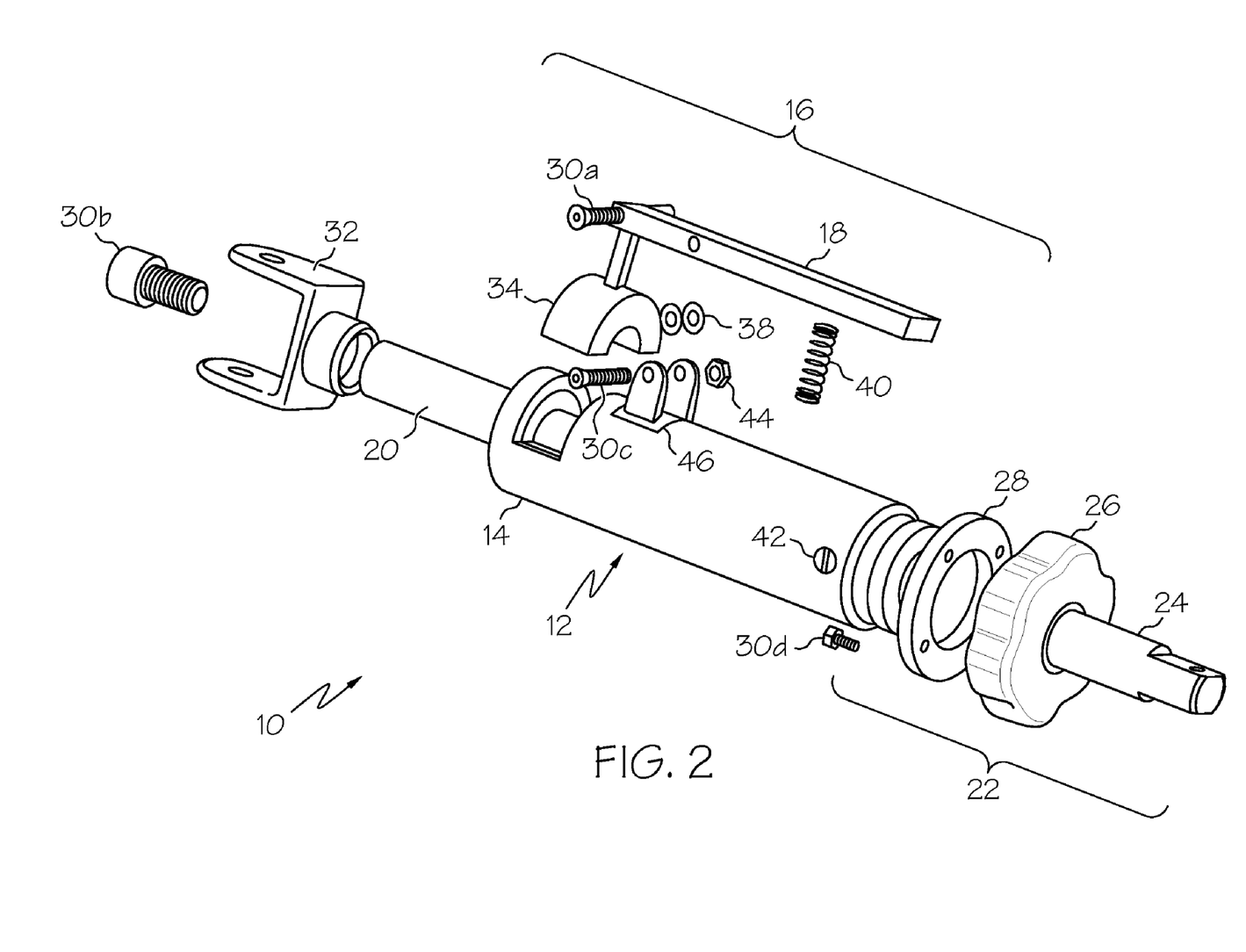
FIG. 2 is an exploded view of an embodiment of the elevation adjustment mechanism of FIG. 1.
Figure 3:
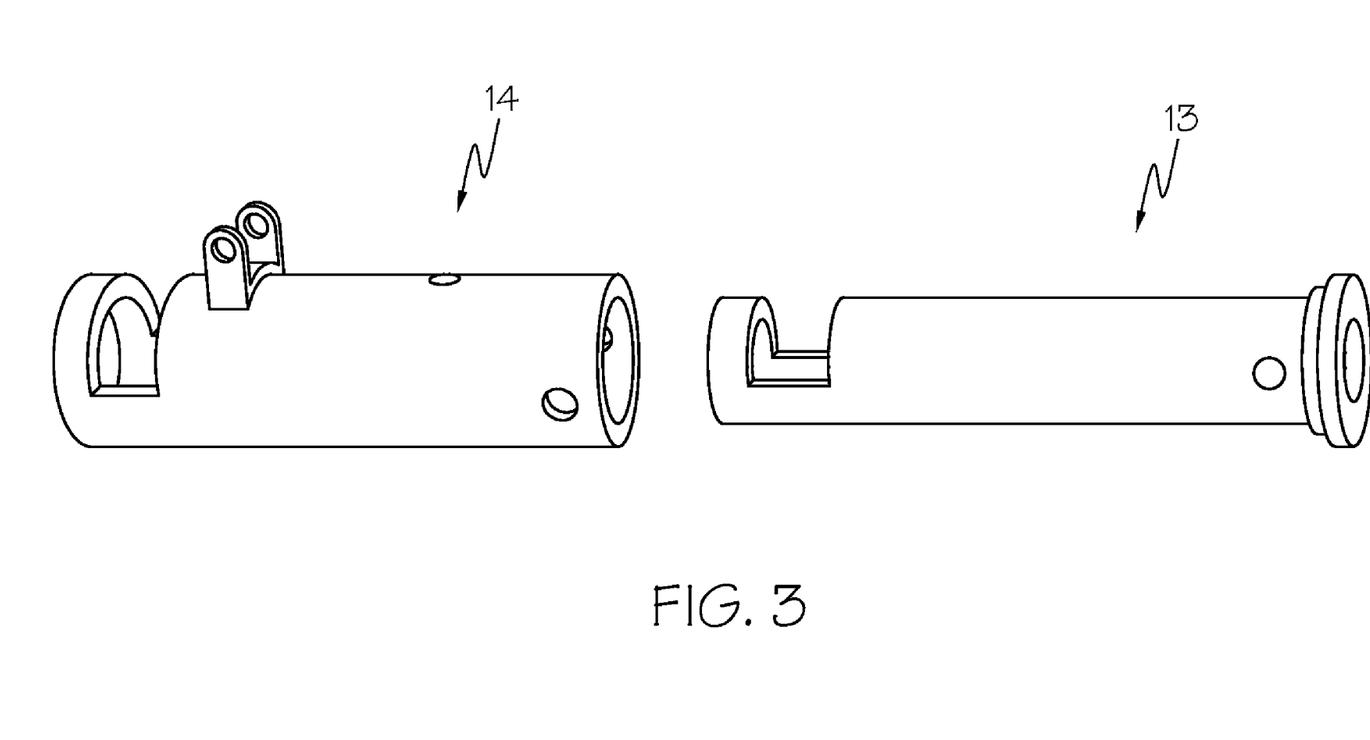
FIG. 3 is a view of the sleeve and the ram cylinder.
Figure 4:
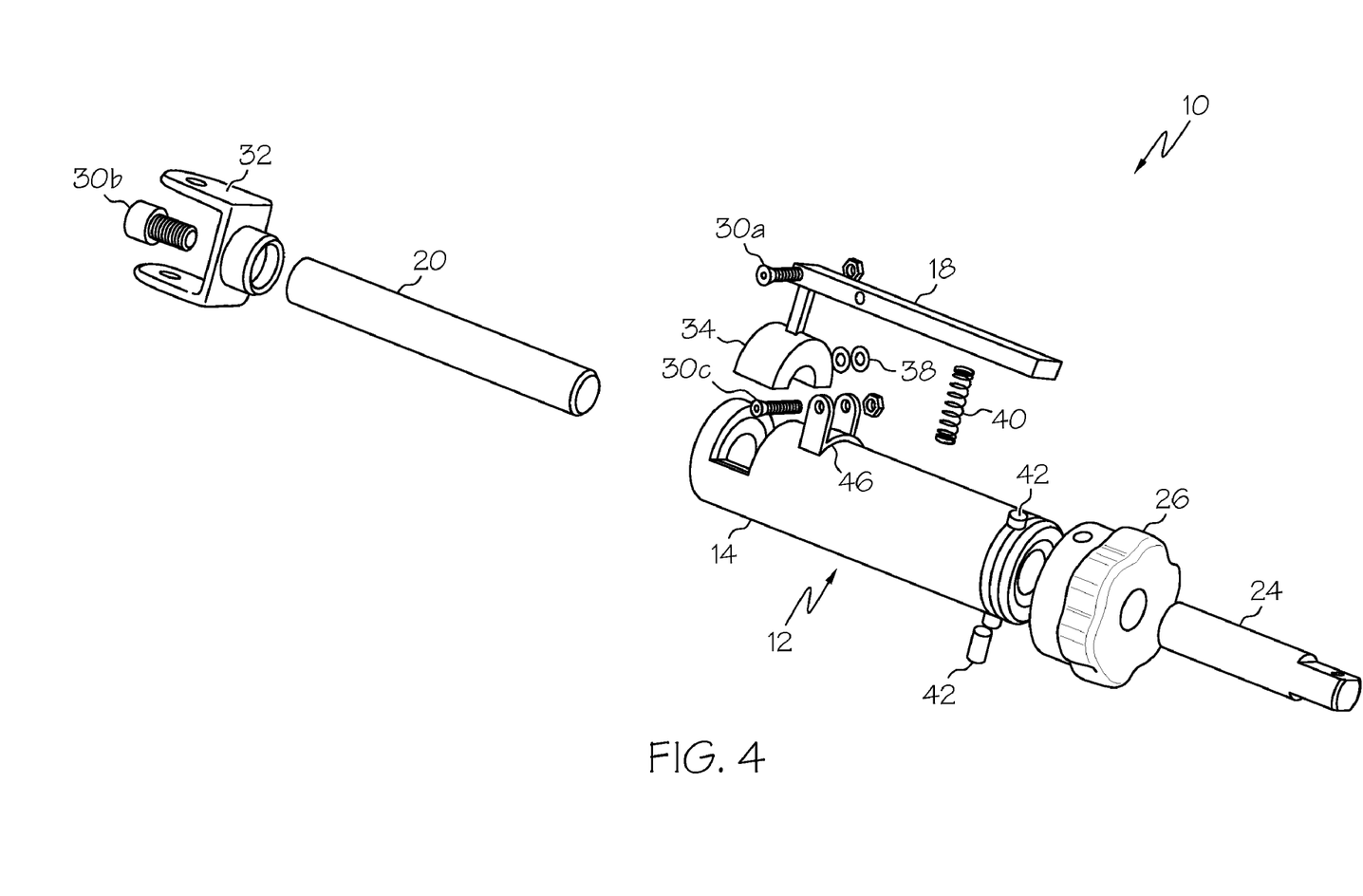
FIG. 4 is an exploded view of another embodiment of the elevation adjustment mechanism of FIG. 1.

As shown in FIGS. 2 and 4, in some embodiments, one end of the coarse adjustment rod 20 is engaged to a clevis mount 32 by a cap screw 30b. Thus, in this embodiment, end of the coarse adjustment rod 20 engaged to the clevis mount 32 has a threaded opening for the cap screw 30b. The other end of the coarse adjustment rod 20 is within the housing 12 of the elevation adjustment mechanism 10. Thus, at least a portion of the coarse adjustment rod 20 is disposed within the housing 12. The coarse adjustment lever 18 is engaged to a clamping assembly 34 by a cap screw 30a. In this embodiment, the coarse adjustment lever 18 is releasably engaged to the coarse adjustment rod 20 by the clamping assembly 34. The coarse adjustment lever 18 is engaged to the ram cylinder 14 of the housing 12 by a spring 40 and by a mounting assembly 46. In some embodiments, the clamping assembly 34 engages the coarse adjustment rod 20 through an opening in the housing 12. As shown in FIG. 3, the opening in the housing 12 is comprised of an opening in the sleeve 13 that is aligned with an opening in the ram cylinder 14 when the sleeve 13 is disposed within the ram cylinder 14.

In other embodiments, the clamping assembly 34 engages the coarse adjustment rod 20 adjacent to the housing 12. Note that any distance can separate the side of the clamping assembly 34 from the side of the housing 12 so long as the movement of the clamping assembly 34, e.g. when the coarse adjustment lever 18 is depressed, is not hindered by contact with the housing 12. In this embodiment, an interface guides the interaction between the coarse adjustment rod 20 and the clamping assembly 34.

FIGS. 2 and 4 are views of the component parts of the elevation adjustment mechanism 10 of FIG. 1 showing two different methods of engaging the fine adjustment mechanism 22 to the housing 12. In at least one embodiment, the fine adjustment mechanism 22 is a threaded mechanism. In this embodiment, the fine adjustment mechanism 22 comprises a fine adjustment rod assembly 24, a fine adjustment nut 26 and a fine adjustment washer 28, as shown in FIG. 2. In one embodiment, the fine adjustment washer 28 and the fine adjustment nut 26 are slipped over opposite ends of the sleeve 13 and engaged to one another by cap screws 30d, as discussed in greater detail below. The fine adjustment rod 24 extends through the end of the sleeve 13 so that a first portion of the fine adjustment rod 24 is disposed within the sleeve 13 of the housing 12 and a second portion of the fine adjustment rod 24 extends from the sleeve 13. In some embodiments, the second portion is engaged to a platform 108, as discussed in greater detail below. It is within the scope of the invention for the fine adjustment rod 24 to have any length and any diameter. In some embodiments, the fine adjustment mechanism 22 has zero backlash adjustability. In one embodiment, tapered pin guides for the screws 42 provide the zero backlash adjustability.

An alternative manner of engaging the fine adjustment mechanism 22 to the ram cylinder 14 is shown in FIG. 4. In this embodiment, the fine adjustment nut 26 is engaged to the ram cylinder 14 by set screws 42. It is within the scope of the invention for two or more set screws 42 engage the fine adjustment nut 26 to the ram cylinder 14. Thus, there can be two, three, four, five, six, seven, eight or more set screws 42. Note that except for the manner of engaging the fine adjustment nut 26 to the ram cylinder 14, the other aspects of the elevation adjustment mechanism 10 are the same as in FIG. 2.

Assembly of the elevation adjustment mechanism 10 shown in FIG. 2 is as follows: First the fine adjustment rod assembly 24 is inserted into the proximal opening of sleeve 13 so that it exits through the distal opening of the sleeve 13. The fine adjustment nut 26 is threaded onto the fine adjustment rod 24 from the right or distal end of the fine adjustment rod 24 and the fine adjustment washer 28 is slid over the sleeve 13 from the left or proximal end until the fine adjustment nut 26 and the fine adjustment washer 28 are side by side at the right or distal end of the fine adjustment rod 24. Note that the diameter of the distal end region of the sleeve 13 has a first diameter and a second diameter. The first diameter is greater than the second diameter and both diameters are greater than the diameter of the rest of the sleeve 13. Thus, the first diameter corresponds to the diameter of the fine adjustment nut 26 and the second diameter corresponds to the diameter of the fine adjustment washer. The fine adjustment washer 28 and the fine adjustment nut 26 are then engaged to one another. Note that because the second diameter is less than the first diameter, the position of the fine adjustment washer 28 and the fine adjustment nut 26 is maintained. In one embodiment, cap screws 30 are used to engaged the fine adjustment washer 28 and the fine adjustment nut 26 together.

Then the proximal end of the sleeve 13/fine adjustment mechanism 24 is inserted into the distal opening of the ram cylinder 14, as shown in FIG. 3. The sleeve 13 and the ram cylinder 14 are engaged to one another. In some embodiments, set screws 42 engage the sleeve 13 and the ram cylinder 14 together, as shown in FIG. 1 for example. Spring 40 is inserted into a relief in the ram cylinder 14 then the clamping assembly 34 and coarse adjustment lever 18 are engaged to each other and to the ram assembly 14 with cap screws 30a,c and washers 38 and/or hex nuts 44. Then the coarse adjustment lever 18 is engaged and the proximal end of the housing 12 is slid over the coarse adjustment rod 20.

Assembly of the elevation adjustment mechanism 10 shown in FIG. 4 is as follows: First the fine adjustment rod assembly 24 is inserted into the proximal opening of sleeve 13 so that it exits through the distal opening of the sleeve 13. The fine adjustment nut 26 is threaded onto the fine adjustment rod 24 from the proximal end of the fine adjustment rod 24 so that a portion of the fine adjustment nut 26 is disposed about an end region of the sleeve 13. Then the fine adjustment nut 26 is engaged to the sleeve 13. Then the proximal end of the sleeve 13/fine adjustment mechanism 24 is inserted into the distal opening of the ram cylinder 14. Assembly of the rest of the elevation adjustment mechanism 10 proceeds as described above.

In at least one embodiment, the coarse adjustment mechanism 16 changes the pointing elevation, i.e. rotation about a horizontal pivot, otherwise known as the pitch, +/−20 degrees from horizontal. In some embodiments, the coarse adjustment mechanism 16 has a pointing resolution of approximately 1.0 degree. In at least one embodiment, the fine adjustment mechanism 22, provides precision elevation alignment, either upwards or downwards. In some embodiments, the precision elevation alignment of the fine adjustment mechanism 22 is infinite.

Figure 5:
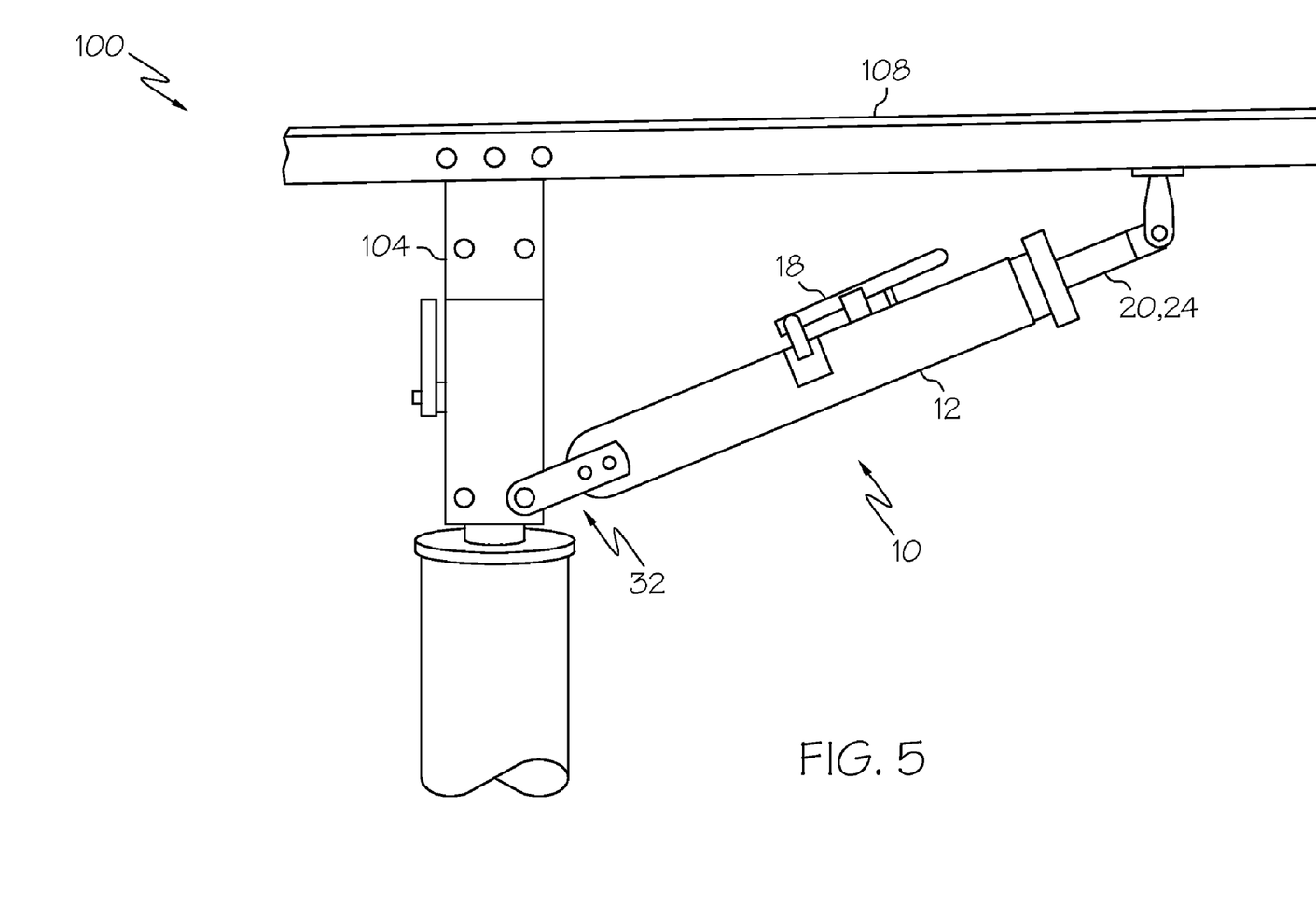
FIG. 5 is the elevation adjustment mechanism, engaged to a platform and a vertical support of a bench, that has a single rod for both the coarse adjustment mechanism and the fine adjustment mechanism.

In at least one embodiment, the elevation adjustment mechanism 10 has a combined fine and coarse adjustment mechanisms 16,22 with one threaded rod 20,24 used for both the fine adjustment mechanism 22 and coarse adjustment mechanism 16 of the elevation adjustment mechanism 10, as shown in FIG. 5. Thus, in this embodiment, the fine adjustment rod 24 and the coarse adjustment rod 20 are different regions of a single rod 20,24. It is within the scope of the invention for the rod 20,24 to have any length and any diameter. In addition, it is within the scope of the invention for the different regions of the single rod 20,24, i.e. the coarse adjustment rod 16 and the fine adjustment rod 24, to have the same length or different lengths. In some embodiments, the clevis mount 32 forms a part of the housing 12, as shown in FIG. 5.

Figure 6:
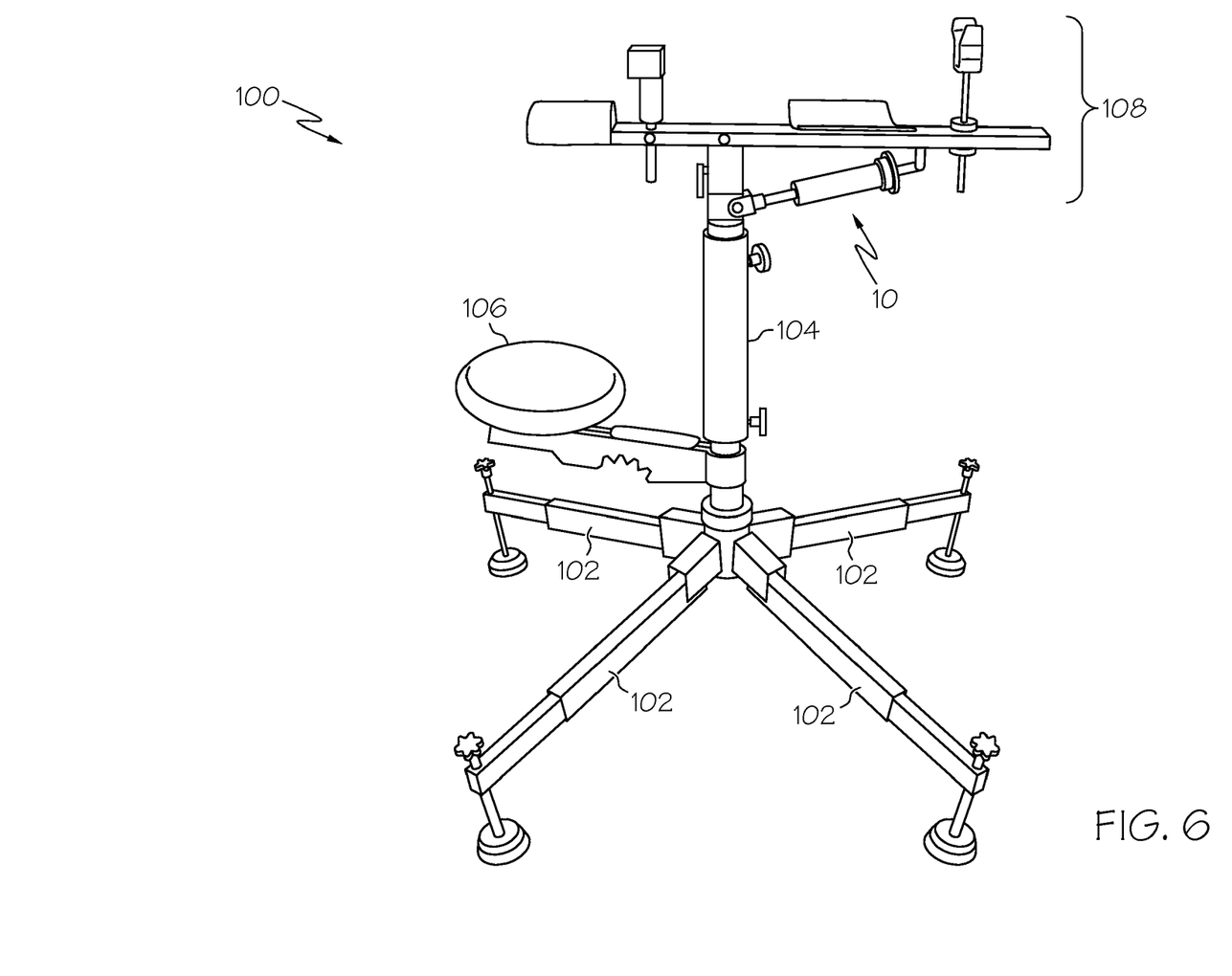
FIG. 6 is a view of a bench with the elevation adjustment mechanism of FIG. 1.

As shown, for example, in FIG. 6, in at least one embodiment, the elevation adjustment mechanism 10 is engaged to a bench 100. In some embodiments, the elevation adjustment mechanism 10 is engaged to a vertical shaft 104 of a bench 100 and to the platform 108 of a bench 100. It is within the scope of the invention for the elevation adjustment mechanism 10 to be engaged to the bench 100 in any manner, for example, but not limited to, a clevis mount 32, a yoke, or other mounting configuration.

A non-limiting example of an apparatus to which the inventive elevation adjustment mechanism 10 can be engaged is the bench 100, shown in FIG. 6. The bench 100 has legs 102, a vertical shaft 104 to which a seat 106 is engaged, a platform 108 and an elevation adjustment mechanism 10. One portion of the elevation adjustment mechanism 10 is engaged to the vertical shaft 104 and a second portion of the elevation adjustment mechanism 10 is engaged to the platform 108. It is within the scope of the invention for the elevation adjustment mechanism 10 to be engaged to the bench 100 by a clevis mount 32, yoke and/or other mounting configuration. Thus, the two portions of the elevation adjustment mechanism 10, e.g. the coarse adjustment rod 20 and the fine adjustment rod 24, can be engaged in the same manner, e.g. a clevis mount 32, or in different manners.

In at least one embodiment, the seat 106 rotates 360 degrees about the vertical shaft 104. It is within the scope of the invention for the platform 108 to support any device, for example, but not limited to, a weapon, a camera, or an optical device. Examples of optical devices include, but are not limited to, monoculars, binoculars, and telescopes. As shown in FIG. 6, the platform 108 is configured to support a firearm. In at least one embodiment, the platform 108 rotates 360 degrees. In some embodiments, the seat 106 and the platform 108 move in unison. In other embodiments, the seat 106 and the platform 108 move independently.

To adjust the platform 108, and thereby adjust the device supported by the platform 108, the user pushes down on the coarse adjustment lever 18 so that the coarse adjustment lever 18 moves closer to the ram cylinder 14 of the housing 12. In this movement the spring 40 is compressed and the clamping assembly 34 is raised away from the coarse adjustment rod 20 as the coarse adjustment lever 18 pivots about the cap screw 30c which engages the coarse adjustment lever 18 to the mounting assembly 46. The cap screw 30c is kept in position by a hex nut 44, as shown in FIG. 2. When the clamping assembly 34 is away from the coarse adjustment rod 20, the coarse adjustment rod 20 can be moved into or out of the housing 12. When the coarse adjustment rod 20 is moved into the housing 12 the platform 108 pivots vertically downwards. When the coarse adjustment rod 20 is moved out of the housing 12, the platform 108 pivots vertically upwards. After the coarse adjustment mechanism 16 has been set to the desired position, the fine adjustment mechanism 22 can be used for precise positioning of the platform 108, upwards or downwards. Thus, adjustment of the platform 108 by the elevation adjustment mechanism 10 allows the user to adjust the aim/line of sight of the device upwards or downwards and rotation of the platform 108 about the vertical shaft 104 of the bench 100 allows the user to adjust the aim/line of sight of the device about a vertical axis, otherwise known as yaw.

What is claimed is:

1. An elevation adjustment mechanism comprising
   a housing, the housing comprising a first end region and a second end region, the housing comprising:
      a ram cylinder, the ram cylinder being a hollow tube;
      a sleeve, the sleeve being a hollow tube, the sleeve having a first end region, at least a portion of the sleeve being disposed within at least a portion of the ram cylinder;
   a coarse adjustment lever;
   a coarse adjustment rod, a first portion of the coarse adjustment rod extending into a first end of the housing so that the first end region of the housing encircles the first portion of the coarse adjustment rod;
   a clamping assembly, the clamping assembly engaged to the coarse adjustment lever and releasably engaged to the coarse adjustment rod, the clamping assembly at least partially residing within an opening defined by the housing, the clamping assembly being engaged to the coarse adjustment lever;
   a fine adjustment washer, the fine adjustment washer being positioned onto the first end region of the sleeve;
   a fine adjustment nut, the fine adjustment nut being positioned onto the first end region of the sleeve, the fine adjustment nut being engaged to the fine adjustment washer; and
   a fine adjustment rod, a portion of the fine adjustment rod being disposed within at least a portion of the sleeve.

2. The elevation adjustment mechanism of claim 1, the coarse adjustment rod being a threaded rod and the clamping assembly being a half-nut.

3. The elevation adjustment mechanism of claim I, the coarse adjustment rod being a smooth rod and the clamping assembly being a half-cylinder.

4. The elevation adjustment mechanism of claim 1, the fine adjustment rod and the coarse adjustment rod being different regions of a single rod.

5. The elevation adjustment mechanism of claim 1, further comprising a clevis mount, the coarse adjustment rod further comprising a second end, the second end of the coarse adjustment rod being engaged to the clevis mount.

6. The elevation adjustment mechanism of claim 1, the coarse adjustment lever engaged to the housing by a mounting assembly.

7. The elevation adjustment mechanism of claim 6, the coarse adjustment lever further engaged to the housing by a spring.

8. An elevation adjustment mechanism, the elevation adjustment mechanism comprising
- a mechanism for coarsely aiming a device comprising a coarse adjustment lever, a coarse adjustment rod and a clamping assembly, the coarse adjustment mechanism constructed and arranged so that depression of the coarse adjustment lever lifts the clamping assembly away from the coarse adjustment rod thereby allowing the user to translate the coarse adjustment rod and to adjust the aim of the device;
- a mechanism for finely aiming a firearm comprising a fine adjustment rod and a fine adjustment nut, wherein rotation of the fine adjustment nut translates the position of the fine adjustment rod, thereby further adjusting the aim of the device, the fine adjustment rod and the coarse adjustment rod being different regions of a single rod.

9. The elevation adjustment mechanism of claim 8, where in the device is selected from at least one member of the group consisting of a weapon, a camera, and an optical device.

10. The elevation adjustment mechanism of claim 8, the clamping assembly being a half-cylinder and the coarse adjustment rod being a smooth rod.

11. The elevation adjustment mechanism of claim 8, the clamping assembly being a half-nut and the coarse adjustment rod being a threaded rod.

12. The elevation adjustment mechanism of claim 8, the fine adjustment mechanism having tapered pin guides providing zero backlash adjustability.

* * * * *

UNITED STATES PATENT AND TRADEMARK OFFICE
CERTIFICATE OF CORRECTION

PATENT NO. : 8,123,180 B2  Page 1 of 1
APPLICATION NO. : 11/934431
DATED : February 28, 2012
INVENTOR(S) : Shipman et al.

It is certified that error appears in the above-identified patent and that said Letters Patent is hereby corrected as shown below:

In the Claims:

Column 6, Line 55, in claim 3 "mechanism of claim I" should be changed to "mechanism of claim 1"

Signed and Sealed this
Seventeenth Day of December, 2013

Margaret A. Focarino
*Commissioner for Patents of the United States Patent and Trademark Office*